Sept. 2, 1952  R. E. TITUS  2,609,037

SAFETY ATTACHMENT FOR THE INFLATION OF TIRES

Filed May 19, 1949

INVENTOR.
RALPH E. TITUS
BY C. E. Beach
ATTORNEY

Patented Sept. 2, 1952

2,609,037

UNITED STATES PATENT OFFICE 2,609,037

SAFETY ATTACHMENT FOR THE INFLATION OF TIRES

Ralph E. Titus, Cincinnati, Ohio

Application May 19, 1949, Serial No. 94,119

5 Claims. (Cl. 157—1)

This invention relates to safety attachment for the inflation of tires, and more specifically, to tools for utilization in the course of inflation of tires on wheels and on demountable rims.

There have been repeated instances of injuries to persons in the course of inflating of pneumatic tires which have been mounted on wheels and on demountable rims. Such injuries have occurred where an edge of a tire has slipped out of engagement with the channel into which it should have been expanded incident to inflation of the inner tube, as well as from so-called "blow-outs."

It is an important object of this invention to provide tools suited for ready application to wheels and rims of various sizes and types, which tools, when so applied, will prevent injury to persons who undertake to inflate associated tires. This is especially important upon the occasion of the first inflation after complete deflation, as following initial mounting or remounting following removal for examination or repair.

It is a further object to provide tools having the aforesaid characteristics, which tools will be capable of successful use by persons of ordinary intelligence and without special training, which will be susceptible of quick application to and removal from wheels and rims, and will be compact and of minimum weight for providing adequate strength.

It is a still further object to provide tools having the foregoing characteristics which will be durable and susceptible of economical manufacture.

Other objects will be in part pointed out and referred to in the ensuing description; and in part will be evident to those skilled in the tool art, in the course of consideration of the ensuing description in the light of the accompanying drawings, in which.

Figure 1:
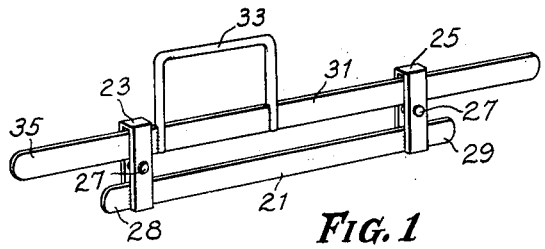
Figure 1 is a perspective view of a tool embodying this invention, which tool is suited for application to demountable tire rims and to certain types of demountable disk wheels in common use.

The tool of Fig. 1 consists of a seizing bar 21, a safety bar 31, a pair of guide loops 23, 25, and a handle 33. The seizing bar 21 is of form and length such that, when applied to an intended wheel or rim, such as the rim 41 shown in Figs. 2 and 3, it will be securely anchored under an inwardly projecting annular portion (such as the flange 43) of such rim.

The ends of the loops 23, 25, are secured to the bar 21, as by spot-welding, and the bar 31 slides freely through said loops.

Convenience in use may be promoted by provision of structure such as will maintain the bar 31 in conveniently spaced relationship with the bar 21. The studs 27, 27 exemplify such a structure.

The handle 33 is suitably secured to the bar 31 and, in addition to providing convenient means for transporting and applying the tool, said handle serves to limit longitudinal movement of said bar with relation to the bar 21 such as would permit complete withdrawal of said bar from either of the loops 23 or 25.

Figure 2:
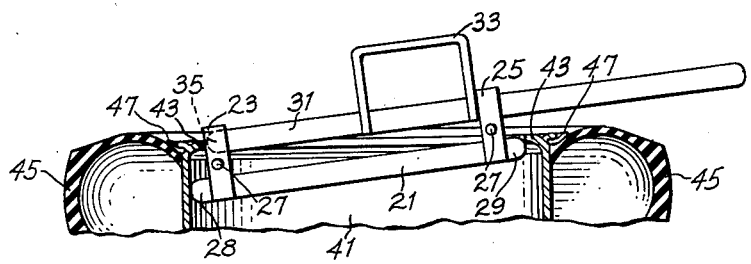
Fig. 2 is an elevation of the tool of Fig. 1 in course of intended application to a rim and an associated tire, which are shown in section.
Figure 3:
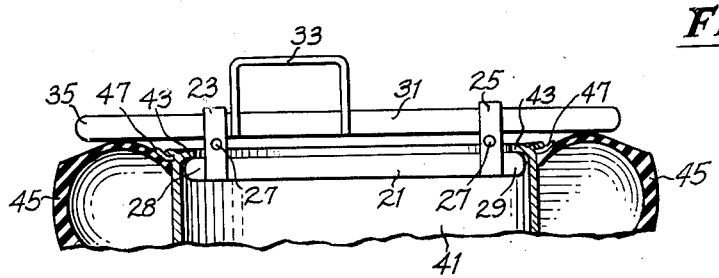
Fig. 3 shows the tool of Fig. 1 after completion of application to the rim and tire of Fig. 2.

The loops 23 and 25 are so positioned along the length of the bar 21 that said loops will permit said bar to be introduced into and applied to a wheel or rim of intended form and size, as indicated in Figs. 2 and 3.

The portion of the handle 33 nearest the end 35 of the bar 31 is spaced from said end so that said handle will not be brought against the loop 23 other than when said end projects sufficiently beyond the associated end 28 of the bar 21 to assure that, when applied to a wheel or a rim in the intended manner, said end 35 will project over the side of the associated tire 45 and its lock ring 47 for a distance such that said bar 31 will serve to protect nearby persons from injury in the event that such lock ring is violently expelled from the rim which should retain it, incident to inflation of the tire.

The other end of said handle 33 is positioned so as to permit movement of the bar 31 which will bring the end 35 thereof into relationship with the end 28 of the bar 21 such as will facilitate introduction of said bar 21 into seizing relationship with an intended wheel or rim; but not sufficient to withdraw said end 35 from the loop 23.

Figure 4:
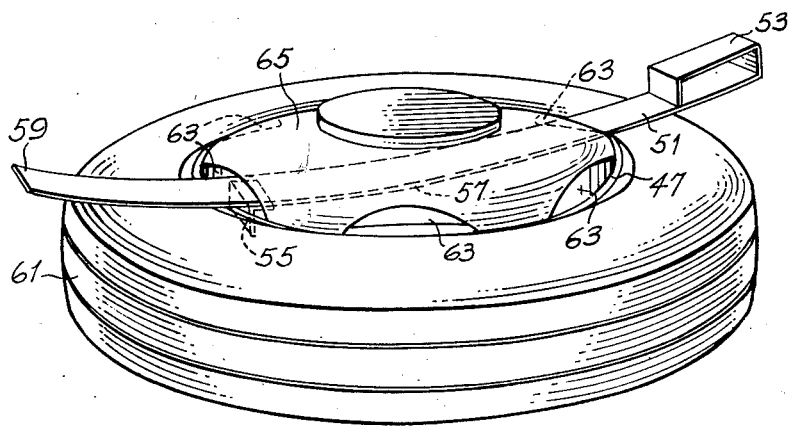
Fig. 4 shows another embodiment of this invention applied in an intended manner to a widely used type of truck wheel.

Referring now to Fig. 4, the safety tool here shown consists of a bar 51, having a handle 53 adjacent one end thereof and a stop ledge 55 near the other end; said bar being bent, as at 57, intermediate the ends thereof, so that, when applied to a wheel in the intended manner, the ends of said bar will pass over the sides of a so-called "over-sized" associated tire, and its lock ring (such as the tire 61 and lock ring 47), when said bar has been applied through openings of a wheel web, such as the openings 63, 63 in the web 65.

Said bar 51 is of length such that, when it has been inserted through available openings in the web of an intended wheel, said bar may be positioned so that its ends will sufficiently overlie portions of the associated lock ring and tire to restrain the extent of their movement in the event of disengagement of the lock ring from the rim, incident to tire inflation.

The angle bar provides a ledge 55 which is positioned at a distance from the adjacent end 59 of the bar 51 such that said ledge will engage a wall of the opening through which said end emerges from an intended wheel-web.

In applying the tool of Fig. 1 to a rim such as that indicated in Figs. 2 and 3, the safety bar 31 is first moved with reference to the seizing bar 21 to a position in which the end 35 of said bar 31 projects a minimum distance outside of or is enclosed within the loop 23.

The leading or entering end 28 of the bar 21 is then inserted in the rim or wheel and moved from the entering edge until, due to the angular positioning of the bar 21 with reference to the plane of the rim 41, the anchoring end 29 of said bar may be moved past the end of the flange 43, as indicated in Fig. 2.

Thereupon, the tool should be positioned so as to bring both ends of the bar 21 against the inner surfaces of the flange 43 at substantially diametrically opposite portions thereof; and the safety bar 31 should then be moved so as to bring the handle 33 into engagement with the loop 23.

The ends of the safety bar 31 will then be positioned over substantially opposite surfaces of the lock ring 47 and the tire 45; as indicated in Fig. 3.

In applying the tool of Fig. 4, the end 59 of said tool should be inserted through an opening in the wheel-web 65, and passed outwardly through an opening in a substantially opposite portion of said web.

In the use of this tool with certain types of wheels, it will be necessary to apply the tool through openings both of which are situated somewhat to one side of the center of the wheel. When applied to wheels which so permit, the tool should be inserted through openings which are most nearly diametrically opposite.

When the tool has been applied as just described, the angle bar 55 will engage a wall of the web-opening through which the tool emerges when the end 59 projects a sufficient distance over the side of the tire to protect the user.

The illustrative embodiments of tire rim safety tools which are shown in the annexed drawing and hereinbefore described in detail are believed to be sufficient for enabling persons skilled in this art to construct and use such tools in accordance with this invention without further explanation; but it should be understood that changes in forms and/or of arrangements of parts may be made from what is so shown and described, within the scope of the appended claims, without departing from the spirit and scope of this invention.

Having thus described my invention, what I claim as new and desire to secure by Letters Patent is:

1. In a tool for promoting safety to persons while inflating pneumatic tires mounted on wheel rims, which rims have edge portions of reduced internal diameter and associated lock rings adjacent such edge portions, the combination of structure comprising a bar of length greater than such reduced diameter portions of intended rims, guard structure comprising a bar at least as long as the diameter of intended lock rings, and means interconnecting said bars for keeping them in substantially parallel planes while permitting relative longitudinal movement therebetween.

2. In a tool for promoting safety to persons while inflating pneumatic tires mounted on wheel rims, which rims have edge portions of reduced internal diameter and associated lock rings adjacent such edge portions, the combination of structure comprising a bar of length greater than such reduced diameter portions of intended rims, guard structure comprising a bar at least as long as the diameter of intended lock rings, means interconnecting said bars for keeping them in substantially parallel planes while permitting relative longitudinal movement therebetween, and means for suitably limiting such relative movement.

3. In a tool for promoting safety to persons while inflating pneumatic tires mounted on wheel rims, which rims have edge portions of reduced internal diameter and associated lock rings adjacent such edge portions, the combination of structure comprising a bar of length greater than such reduced diameter portions of intended rims, guard structure comprising a bar at least as long as the diameter of intended lock rings, means interconnecting said bars for keeping them in substantially parallel planes while permitting relative longitudinal movement therebetween, a handle for transporting and facilitating functional positioning of said bars.

4. A tool in accordance with claim 1 in which said interconnecting means comprises a pair of loops through which one of said bars may freely slide.

5. A tool in accordance with claim 1 in which said interconnecting means comprises a pair of loops through which said guarding structure bar may freely slide, said loops fixedly attached to said first mentioned bar.

RALPH E. TITUS.

REFERENCES CITED

The following references are of record in the file of this patent:

UNITED STATES PATENTS

| Number | Name | Date |
| --- | --- | --- |
| 1,029,279 | Creighton | June 11, 1912 |
| 1,615,469 | McKenzie | Jan. 25, 1927 |
| 2,122,388 | Wilkerson | June 28, 1938 |
| 2,476,209 | Monheit | July 12, 1949 |

FOREIGN PATENTS

| Number | Country | Date |
| --- | --- | --- |
| 623,147 | France | Mar. 14, 1927 |